T. P. Burger,
Furniture Caster.
Nº 18,839. Patented Dec. 15, 1857.
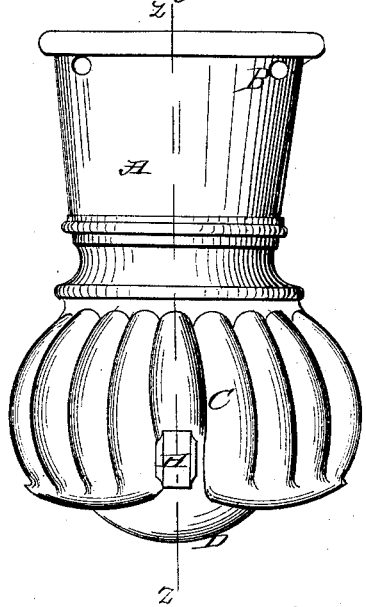
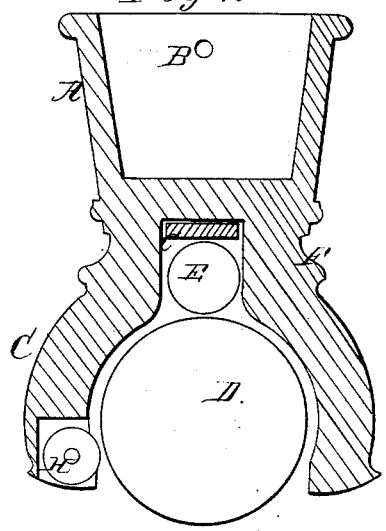
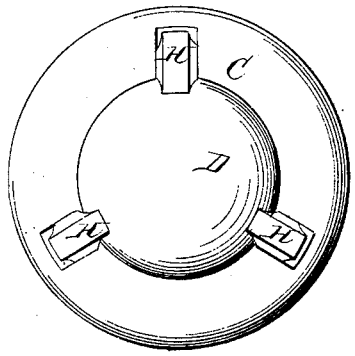

UNITED STATES PATENT OFFICE.

TIMOTHY P. BURGER, OF OYSTER BAY, NEW YORK.

CASTER FOR FURNITURE.

Specification of Letters Patent No. 18,839, dated December 15, 1857.

*To all whom it may concern:*

Be it known that I, TIMOTHY P. BURGER, of the town of Oyster Bay, in the county of Queens and State of New York, have invented a new and useful Improvement in or New Manufacture of Casters for Furniture; and I do hereby declare that the same is described and represented in the following specifications and drawings.

To enable others skilled in the art to make and use my new manufacture of caster, I will proceed to describe its construction and operation, referring to the drawings in which the same letters indicate like parts in each of the figures.

Figure 1 is an elevation of the caster. Fig. 2, is a sectional elevation through the line z, z, of Fig. 1. Fig. 3, shows the bottom of the caster.

The nature of my new manufacture of caster, consists in a large ball arranged to roll upon the floor or carpet and against a small ball arranged above it, and also against friction rollers arranged below the horizontal center of the large ball, so as to retain it in its place when the caster is lifted from the floor.

In the accompanying drawings, A is the socket for the leg of the table, chair, or other article to which the caster may be applied and fastened by screws in the holes B, B.

C, is the lower part of the caster made hollow in the form of an inverted cup, as shown in section Fig. 2, to receive the ball D, which turns in it as the caster is moved on the floor or carpet. The lower or middle portion of the caster is perforated above the ball D, to receive the small ball E, which turns freely in the perforation F, and against the hard metal plate G, placed above the ball E, as shown in section Fig. 2.

In order to hold the ball D, in its place and facilitate its rotation by lessening the friction, I arrange a series of friction rollers H, H, H, around the ball D, and so far below its center horizontally as to hold it in the cup, when the caster is raised or lifted from the floor; while at the same time the rollers H, H, are so arranged as to allow the ball D, to turn freely against them and against the ball E, while they, the rollers H, H, and ball E prevent the ball D from coming in contact with the cup, thereby allowing the ball D to roll easily on the floor or carpet, when the article is moved which is supported by the caster.

I contemplate that the above described caster may be made of such kinds of metals or other materials as will answer the purpose.

I believe I have described and represented my new manufacture of caster, so as to enable any person skilled in the art to make and use it, and I will now state what I desire to secure by Letters Patent, to wit:

I claim—

The new manufacture of caster described, to wit, a ball caster in which the large ball rolls against a small ball arranged above it, and against friction rollers arranged below the horizontal center of the large ball, so as to retain it (the large ball) in its place when the caster is lifted from the floor.

TIMOTHY P. BURGER.

Witnesses:
   I. B. REYNOLDS,
   WM. COSGROVE.